United States Patent [19]

Yokoyama et al.

[11] 4,256,493

[45] Mar. 17, 1981

[54] JET INK COMPOSITION

[75] Inventors: Sigeaki Yokoyama, Sagamihara; Tsunehiko Toyoda; Noriaki Okamura, both of Yokohama, all of Japan

[73] Assignee: Dai Nippon Tokyo Co., Ltd., Osaka, Japan

[21] Appl. No.: 81,930

[22] Filed: Oct. 4, 1979

[51] Int. Cl.³ ............................................... C09D 11/00
[52] U.S. Cl. ................................................ 106/22; 106/26
[58] Field of Search .................. 106/21, 22, 23, 20; 260/45.95 C, 45.95 F

[56] References Cited

U.S. PATENT DOCUMENTS

| | | | |
|---|---|---|---|
| 3,416,153 | 10/1963 | Hertz et al. | 346/75 |
| 3,596,275 | 7/1971 | Sweet | 346/1 |
| 3,694,241 | 9/1972 | Guthrie et al. | 106/20 |
| 3,705,043 | 12/1972 | Zabiak | 106/22 |
| 3,846,141 | 11/1974 | Ostergren | 106/22 |
| 3,979,550 | 9/1976 | Panken | 106/21 |
| 3,994,736 | 11/1976 | Hertz et al. | 106/22 |

OTHER PUBLICATIONS

Penn, W. S., *Paint Manuf.* 32, No. 3 85-88, 92 (1962).

*Primary Examiner*—Lorenzo B. Hayes
*Assistant Examiner*—Amelia B. Yarbrough
*Attorney, Agent, or Firm*—Bucknam and Archer

[57] ABSTRACT

Disclosed is a jet ink composition which comprises an aqueous jet ink containing a water-soluble dye, a wetting agent and water as main components and, incorporated therein, a water-soluble ultraviolet absorbing agent as well as a metal salt, when necessary.

4 Claims, No Drawings

JET INK COMPOSITION

BACKGROUND OF THE INVENTION (1) Field of the Invention

The present invention relates to an aqueous jet ink composition, and more particularly, to an improved aqueous jet ink composition which is capable of being used for a long period of time without causing clogging in the nozzle portion of a jet printer, and which can provide printed matter having good resistance to light.

(2) Description of the Prior Art

The basic printing process using an ink jet comprises introducing an ink into a fine nozzle composed of a metal or glass (having an inner diameter of about 10 to about 200μ), jetting uniform ink particles from the top end of the nozzle and electrostatically deflecting the jetted particles by a deflecting electrode disposed in front of the nozzle to draw a pattern or figure according to a predetermined dot matrix.

Appropriate viscosity, surface tension and electric characteristics can be decided according to methods for jetting inks in the form of uniform particles and controlling the ink particles. In any ink jetting method, however, an ink must be jetted from a fine nozzle in the form of uniform particles in a continuously stable manner.

Accordingly, the basic problem in an ink jet printer is how to completely prevent clogging of the mozzle portion and ensure stable generation of uniform ink particles continuously over a long period of time. Another important requirement is to be able to again form uniform ink particles stably after the jetting operation has been temporarily stopped.

Of course, if a bit of a solvent-insoluble solid adheres to a fine nozzle, clogging naturally would take place. Furthermore, if the solid adheres to a part of the nozzle, the ink would be jetted in a different direction. Accordingly, in order to perform jetting of ink particles stably and continuously, it is necessary not only to maintain the viscosity and surface tension of the ink composition at appropriate levels, but also to remove solvent-insoluble solids completely from the ink composition. Moreover, it is necessary to prevent occurrence of an undesirable phenomenon wherein solvent-insoluble solids are formed in the ink composition with the passage of time.

Thus, inks that are used for the ink jet printing method for forming letters of patterns on a recording material by jetting liquid drops from a very fine nozzle are required to have the above-mentioned special properties. In other words, it is necessary to use an ink composition which does not contain particles that could cause clogging of the nozzle and which does not become dry or yield precipitates in the nozzle opening, even if the printing device is stopped for a certain period of time.

Various aqueous jet ink compositions comprising a water-soluble dye, a wetting agent and water have heretofore been known as ink compositions meeting the above requirements. For example, there can be mentioned a composition comprising a water-soluble dye, water and a lower alkoxy triglycol, polyethylene glycol, polypropylene glycol or a lower alkyl ether of ethylene glycol, diethylene glycol, propylene glycol or glycerol and having a viscosity of from 1.0 to 10 cp (as measured at 25° C.) and a specific resistance lower than 150 Ω-cm (see U.S. Pat. No. 3,846,141), a jet ink composition comprising a water-soluble dye, a non-volatile water-soluble polymer oil and a chelating agent (see Japanese Patent Laid-Open No. 85804/76 (U.S. Patent Application Ser. No. 534,520)), a jet ink composition comprising water, a water-soluble dye and a polyhydric alcohol (see Japanese Patent Publication No. 8361/75), and an infrared absorption jet printing ink composition comprising a coloring material having 50% absorption in the wavelength region of 700 to 1000 nm (dye or water-dispersed carbon black), an alkylene glycol or alkyl ether of alkylene glycol and water and having a viscosity of 1 to 10 cp (as measured at 25° C.) and a specific resistance of 50 to 5000 Ω-cm (see U.S. Pat. No. 3,705,043).

However, these ink compositions comprising water, a water-soluble dye and a wetting agent are defective in that colored letters or patterns formed by ink jet printing are extremely poor in resistance to light and hence will disappear when exposed to the sun light.

As a means to eliminate these defects, there has been proposed that a jet ink composition in which a premetallized dye, that is, a dye complex with a metal such as chromium or copper, is used instead of the water-soluble dye, and a lower aliphatic monohydric alcohol and an inorganic salt are used in combination with such premetallized dye (see U.S. Pat. No. 3,994,736).

However, it is impossible to produce all the hues by such premetallized dyes having good light resistance, and the composition is defective in that high chromatic color cannot be obtained in regions of the three primary colors.

It is known that an inorganic salt such as Glaubers' salt ($Na_2SO_4$), KCl, NaCl, LiCl, $NH_4NO_3$ or $NH_4Cl$ is added to adjust the specific resistance of jet ink compositions (see, for example, U.S. Pat. Nos. 3,846,141, 3,705,043, 3,416,153 and 3,596,275).

However, letters or patterns formed by such jet ink composition are very poor in resistance to light. That is, such inorganic salts act only as a specific resistance adjusting agent and do not contribute to increase in the light-resistance.

As will be apparent from the above illustration, no jet ink composition exists which shows excellent light-resistance while using an ordinary water-soluble dye producing high chromatic color.

In an aqueous jet ink composition, coloration is ordinarily accomplished by the use of a water-soluble dye while removing solvent-insoluble solids and preventing formation of such solids.

In an aqueous jet ink composition comprising a water-soluble dye, it is easy to satisfy the basic requirement of the ink jet printing method, that is, the prevention of the formation of solvent-insoluble solids, but there is a defect involved wherein the light resistance of the obtained prints printed matter is insufficient.

More specifically, recorded letters disappear or become difficult to read when a certain period has elapsed. Furthermore, in the case of color images, discoloration or color change is often caused by differences in light resistance among mixed dyes.

In other words, water-soluble dyes customarily used for the conventional aqueous jet ink compositions are poor in light-resistance. Moreover, because of various conditions required to satisfy quality requirements in jet ink compositions, such as prevention of clogging of the nozzle and an increase in the adaptability to continuous jetting and also because of hue and chroma required in prints, the kinds of water-soluble dyes applicable to the ink jetting printing method are naturally limited.

With the foregoing as a background, we conducted research with a view to developing a novel jet ink composition which would not cause clogging of the nozzle, as is often experienced in the conventional compositions, and which would improve the light resistance of prints and permit an increase in the kinds of applicable water-soluble dyes.

As a result of such research, we arrived at the novel jet ink composition of the present invention comprising an aqueous jet ink and an ultraviolet absorbing agent, and if desired with a specific metal salt. When the composition of the present invention is used, formation of solvent-insoluble solids causing clogging of the nozzle can be prevented and the light-resistance of prints can be improved without any reduction in the excellent recording characteristics of the ink jet recording method.

SUMMARY OF THE INVENTION

The present invention relates to an aqueous jet ink composition, and more particularly to an improved aqueous jet ink composition which is capable of being used for a long period of time without causing clogging in the nozzle portion of a jet printer, and which can provide printed matter having good resistance to light.

In accordance with the fundamental aspect of the present invention, there is provided a jet ink composition which comprises an aqueous jet ink containing a water-soluble dye, a wetting agent and water as main components, and, incorporated therein, a water-soluble ultraviolet absorbing agent and, when required, a variety of metal salts.

In accordance with one preferred embodiment of the present invention, there is provided an aqueous jet ink composition comprising an aqueous jet ink containing a water-soluble dye, a wetting agent and water as main components and, incorporated therein, a water-soluble ultraviolet absorbing agent selected from 2-hydroxy-4-methoxybenzophenone-5-sulfonic acid or its sodium salt having the following structural formula (I):

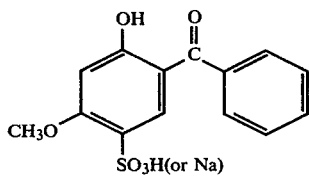

and, 2,2'-dihydroxy-4,4'-dimethoxybenzophenone-5-sulfonic acid or its sodium salt having the following structural formula (II):

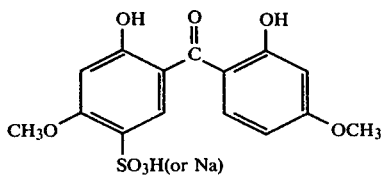

DETAILED DESCRIPTION OF THE INVENTION

In order to attain the intended effect of improving light-resistance, it is required that the water-soluble ultraviolet absorbing agent be incorporated in an amount of at least 0.2 part by weight per 100 parts by weight of the jet ink composition. In order to attain a sufficient effect, it is preferred that the amount of the ultraviolet-absorbing agent be at least 0.5 part by weight per 100 parts by weight of the jet ink composition. On the other hand, in order to prevent clogging of the nozzle, it is preferred that tha amount of the ultraviolet absorbing agent be not larger than 10 parts by weight, especially not larger than 5 parts by weight, per 100 parts by weight of the jet ink composition.

When a predetermined amount of the water-soluble ultraviolet absorbing agent is incorporated in an aqueous jet ink composition according to the present invention, the ink composition can be stably jetted in the form of uniform particles for a long period of time without clogging the nozzle. However, it has been found that, if the water-soluble ulraviolet absorbing agent is incorporated in an amount exceeding 5 parts by weight per 100 parts by weight of the ink composition, solvent-insoluble solids tend to precipitate in the air-ink interface while the jet printing apparatus is temporarily stopped.

In order to enhance the effects of improving light resistance and preventing formation of solvent-insoluble solids and to improve the electric characteristics of the jet ink composition, it is preferred that the above-mentioned compound having the structural formula (I) or (II) be used as the ultraviolet absorbing agent. Each of the ultraviolet absorbing agents having the above structural formulae (I) and (II) has a spectrum curve characterized by absorbing rays having a wavelength shorter than 380 m$\mu$ but hardly absorbing visible rays having a longer wavelength.

In the case of prints obtained by the ink jet method, which have poor light-resistance, the discoloration is greatly influenced by ultraviolet rays having a wavelength shorter than 380 m$\mu$.

Accordingly, if the ultraviolet absorbing agent represented by the chemical formula (I) or (II) is incorporated, discoloration by ultraviolet rays can be reduced and its light resistance can be further improved. This allows an excellent aqueous jet ink composition to be obtained.

In the jet ink composition of the present invention, a wetting agent which is liquid at normal temperature is used. For example, there can be used polyhydric alcohols such as diethylene glycol, triethylene glycol, polyethylene glycol having a molecular weight of about 300, glycerin and propylene glycol; alkyl ethers and acetic acid esters of polyhydric alcohols, such as ethylene glycol monomethyl ether, diethylene glycol monobutyl ether, ethylene glycol monomethyl ether acetate and tripropylene glycol methyl ether; hydroxyalkyl formamides such as those having 1 to 4 carbon atoms in the alkyl group; and N-vinyl-2-pyrrolidone oligomers synthesized according to the process disclosed in Japanese Patent Laid-Open No. 102407/75. They are used singly or in a mixture of two or more.

The kind of water-soluble dye that is used in the aqueous jet ink composition of the present invention is not particularly critical as long as the dye has good water solubility. The effect of adding the above-mentioned specific ultraviolet absorbing agent is especially prominent when a water-soluble dye having a low light-resistance is used.

Specific examples of the water-soluble dyes include C.I. Direct Blue 236, C.I. Direct Blue 203, C.I. Direct Blue 202, C.I. Direct Blue 15, C.I. Acid Blue 7, C.I.

Acid Blue 9, C.I. Acid Yellow 1, C.I. Direct Red 227, C.I. Direct Red 225, C.I. Acid Red 87, C.I. Acid Red 92, C.I. Acid Red 52, C.I. Direct Black 51, and C.I. Direct Black 19.

Water-soluble solvents such as dioxane, acetone, diacetone alcohol, alkyl alcohols having 1 to 3 carbon atoms, dimethylformamide, dimethylsulfoxide, N-methyl-2-pyrrolidone and mixtures thereof may be incorporated into the aqueous jet ink composition of the present invention.

If necessary, a surface tension adjusting agent may be added to the aqueous jet ink composition of the present invention. As the surface tension adjusting agent, there can be used, for example, cationic surface active agents such as sodium alkyl sulfate, anionic surface active agents such as alkyl pyridium sulfate, non-ionic surface active agents such as polyoxyethylene alkyl ethers, and amphoteric surface active agents.

Furthermore, small amounts of viscosity modifiers such as hydroxypropyl cellulose, carboxymethyl cellulose, hydroxyethyl cellulose and polyvinyl alcohol, and mildewproofing agents and antiseptic agents such as sodium dehydroacetate and an amine salt of 1,2-benzisothiazolin-3-on may be incorporated in the jet ink composition of the present invention.

In the jet ink composition of the present invention, it is preferred that the water-soluble ultraviolet absorbing agent be incorporated in an amount of 0.2 to 10 parts by weight per 100 parts by weight of the jet ink comprising 0.1 to 10% by weight of the water-soluble dye and 5 to 40% by weight of the wetting agent with the balance being water.

From the viewpoint of the adaptability of the ink jet printing operation, it is preferred that the viscosity of the aqueous jet ink composition of the present invention be in the range of 1.2 to 30 cp and the non-volatile component content be lower than about 50% by weight.

In accordance with another aspect of the present invention, there is provided a jet ink composition comprising an aqueous jet ink containing a water-soluble dye, a wetting agent and water as main components and, incorporated therein, a water-soluble ultraviolet absorbing agent and at least one compound selected from the group consisting of carbonates, silicates, acetates, nitrates, phosphates and chlorides of sodium, potassium and lithium.

We conducted research with a view to discovering a substance capable of further improving light-resistance in the jet ink composition of the present invention when this substance is incorporated in combination with the water-soluble dye, and as a result, arrived at the aforesaid jet ink composition.

It is known that the light-resistance of a dyed article (an ink jet print in the present invention) is influenced by the substrate, the incorporated substance, environmental conditions and other factors and that their actions (interaction) are closely related to one another. Various problems are left unsolved in the system of discoloration by light and it has been difficult to construct a unified theory.

As well-known special interactions with the substrate, there can be mentioned, for example, a high light-resistance in acrylic fibers dyed with a cationic dye and a low light-resistance in a nylon article dyed with a yellow vat dye.

We examined various water-soluble compounds to discover substances capable of improving light-resistance by interaction with the incorporated substance, and as a result, have found that a specific metal salt can remarkably improve the light-resistance in the presence of a water-soluble ultraviolet absorbing agent.

As such specific metal salt, use can be made of at least one member selected from the group consisting of carbonates, silicates, acetates, nitrates, phosphates and chlorides of sodium, potassium and lithium.

More specifically, there can be mentioned sodium carbonate, potassium carbonate, lithium carbonate, sodium-potassium carbonate, sodium hydrogencarbonate, potassium hydrogencarbonate, lithium hydrogencarbonates, sodium acetate, potassium acetate, lithium acetate, sodium silicate represented by the general formula $Na_2O \cdot nSiO_2$ in which n is a number of from 0.5 to 4, potassium silicate represented by the general formula $K_2O \cdot nSiO_2$ in which n is a number of from 2 to 3.8, lithium silicate represented by the general formula $Li_2O \cdot nSiO_2$ in which n is a number of from 4 to 6, sodium nitrate, potassium nitrate, lithium nitrate, sodium phosphate, disodium hydrogenphosphate, sodium dihydrogenphosphate, potassium phosphate, dipotassium hydrogenphosphate, potassium dihydrogenphosphate, lithium phosphate, disodium hydrogenphosphate, lithium dihydrogenphosphate, sodium chloride, potassium chloride and lithium chloride.

Carbonates, silicates and acetates of sodium, potassium and lithium are especially preferred.

These metal salts show a certain effect of improving the light-resistance even if they are not used in combination with an ultraviolet absorbing agent. However, an especially high light-resistance-improving effect can be attained when these metal salts are used in combination with a water-soluble ultraviolet absorbing agent.

It is preferred that the metal salt be incorporated in an amount of up to about 5.0 parts by weight, especially 0.1 to 5.0 parts by weight, per 100 parts by weight of the jet ink composition comprising a water-soluble dye, a wetting agent and water. If the amount of the metal salt exceeds about 5 parts by weight per 100 parts by weight of the jet ink composition, a reduction in light-resistance results and, when the ink is dried, precipitates are often formed, resulting in clogging of the nozzle.

Commercially available water-soluble ultraviolet absorbing agents may be used in the above composition. However, in order to improve the light-resistance of prints and prevent formation of solvent-insoluble solids, and from the viewpoint of the ink composition, it is most preferred that the compound having the above structural formula (I) or (II) be used as the water-soluble ultraviolet absorbing agent.

As pointed out hereinbefore, each of the ultraviolet absorbing agents having the structural formula (I) and (II) has a spectrum curve characterized by absorbing rays having a wavelength shorter than 380 mµ but hardly absorbing visible rays having a larger wavelength. It is considered that in case of ink jet prints having a poor light-resistance, discoloration is greatly influenced by ultraviolet rays having a wavelength shorter than 380 mµ.

Therefore, according to the above-mentioned preferred embodiment of the present invention, by incorporating the ultraviolet absorbing agent having the above chemical formula (I) or (II) and the above-mentioned specific metal salt, there can be obtained an aqueous jet ink composition having a further improved light-resistance and providing printed matter having much reduced discoloraion due to ultraviolet rays.

A wetting agent which is liquid at normal temperatures is used also in this preferred composition. Specific examples of the wetting agent used are those exemplified above. They are used singly or in a mixture of two or more.

The kind of water-soluble dye to be used in this preferred embodiment is not particularly critical as long as the water solubility is good. The effect by addition of the ultraviolet absorbing agent and metal salt is especially prominent in the case of a dye having poor light-resistance. Specific examples of water-soluble dyes to be used are those exemplified above.

Also in this aqueous jet ink composition, small amounts of water-soluble solvents, surface tension adjusting agents, viscosity modifiers, mildew-proofing agents and antiseptic agents such as mentioned above may be incorporated as needed.

This preferred jet ink composition is preferably prepared by incorporating 0.2 to 10 parts by weight, especially 0.5 to 5 parts by weight, of the water-soluble ultraviolet absorbing agent and 0.1 to 5 parts by weight of the metal salt in 100 parts by weight of the jet ink composition comprising 0.1 to 10% by weight of the water-soluble dye and 5 to 40% by weight of the wetting agent, with the balance being water.

From the viewpoint of practical adaptability to the ink jet printing operation, it is preferred that the viscosity of this aqueous jet ink composition be 1.2 to 30 cp and the non-volatile component content be lower than about 50% by weight.

The aqueous jet ink composition of the present invention completely satisfies various requirements in the ink jetting printing method, such as the requirement of preventing nozzle clogging, and the light-resistance of printed matter can be highly improved. Moreover, other effects which can be attaind are an increase in the number of applicable water-soluble dyes and a broadening of the applicable range of the ink jet printing method. The present invention therefore affords various industrial advantages.

The present invention will now be described in detail with reference to the following Examples that by no means limit the scope of the invention.

EXAMPLES 1 to 8

Ink materials shown in Table 1 were mixed and agitated for 1 hour, and after the pH was adjusted to 9.0 by NaOH, the mixture was filtered under pressure by a membrane filter having a pore size of 1.2$\mu$ (manufactured by Millipore Co., Ltd.) to form an aqueous jet ink composition in accordance with the present invention. Recording characteristics of the aqueous jet ink composition were examined by using an ink jet printer (Typutor manufactured by Casio Keisanki Kabushiki Kaisha), and the continuous jetting stability was evaluated based on the grade of printed letters obtained when the printing operation was conducted for 100 hours.

The light-resistance was evaluated on the basis of the degree of discoloration observed when prints were exposed to a Mitsubishi Germicidal Lamp GL-3 (manufactured by Mitsubishi Denki Kabushiki Kaisha) for 100 hours.

COMPARATIVE EXAMPLES 1 AND 2

Comparative compositions shown in Table 1 were prepared in the same manner as described in Examples 1 to 8, and the continuous jetting stability and light resistance were determined according to the methods described in Examples 1 to 8.

TABLE 1

| | Example No. | | | | | | | | Comparative Example No. | |
|---|---|---|---|---|---|---|---|---|---|---|
| | 1 | 2 | 3 | 4 | 5 | 6 | 7 | 8 | 1 | 2 |
| Composition (parts by weight) | | | | | | | | | | |
| C.I. Acid Red 87 | 1.0 | 1.0 | | 1.0 | 1.0 | | 1.0 | | 1.0 | |
| C.I. Direct Blue 15 | | | 1.0 | | | 1.0 | | 1.0 | | 1.0 |
| Polyethylene glycol #400 | 10 | 10 | 10 | 10 | 10 | 10 | 10 | 10 | 10 | 10 |
| Sodium dehydroacetate | 0.2 | 0.2 | 0.2 | 0.2 | 0.2 | 0.2 | 0.2 | 0.2 | 0.2 | 0.2 |
| Water | 90 | 90 | 90 | 90 | 90 | 90 | 90 | 90 | 90 | 90 |
| Ultraviolet absorbing agent (I) | 0.2 | 0.5 | 1 | 5 | 10 | | | | | |
| Ultraviolet absorbing agent (II) | | | | | | 0.5 | 1 | 5 | | |
| Experimental Results | | | | | | | | | | |
| Light-resistance | Δ | 0 | 0 | 0 | 0 | 0 | 0 | 0 | X | X |
| Continuous jetting stability | 0 | 0 | 0 | 0 | 0 | 0 | 0 | 0 | 0 | 0 |

Note
0:excellent
Δ:ordinary
X:poor

EXAMPLES 9 TO 20

Ink materials shown in Table 2 were mixed and agitated for 1 hour, and after the pH was adjusted to 9.0 to 11.0 by NaOH or H$_2$SO$_4$, the mixture was filtered under pressure by a membrane filter having a pore size of 1.2$\mu$ (manufactured by Millipore Kabushiki Kaisha) to form an aqueous jet ink composition in accordance with the present invention. Recording characteristics of the aqueous jet ink composition were examined by using an ink jet printer (Typutor manufactured by Casio Keisanki Kabushiki Kaisha), and the continuous jetting stability was evaluated on the basis of the grade of printed letters obtained when the printing operation was conducted for 100 hours.

The light-resistance was evaluated on the basis of the degree of discoloration observed when prints were exposed to a Mitsubishi Sterilizing Lamp GL-3 (manufactured by Mitsubishi Denki Kabushiki Kaisha) for 100 and 150 hours.

COMPARATIVE EXAMPLES 3 AND 4

Comparative compositions shown in Table 2 were prepared in the same manner as described in Examples 9 to 20, and the continuous jetting stability and light-resistance were determined according to the methods described in Examples 9 to 20.

| Composition | Example No. | | | | | | | | | | | | Comparative Example No. | |
|---|---|---|---|---|---|---|---|---|---|---|---|---|---|---|
| (parts by weight) | 9 | 10 | 11 | 12 | 13 | 14 | 15 | 16 | 17 | 18 | 19 | 20 | 3 | 4 |
| C.I. Acid Red 87 | 1.0 | 1.0 | 1.0 | 1.0 | 1.0 | | | | 1.0 | | | | 1.0 | |
| C.I. Direct Blue 15 | | | | | | | | | | 1.0 | | | | |
| C.I. Acid Red 92 | | | | | | 1.0 | 1.0 | 1.0 | 1.0 | 1.0 | | 1.0 | | 1.0 |
| Polyethylene glycol #400 | 10 | 10 | 10 | 10 | 10 | 10 | 10 | 10 | 10 | 10 | 10 | 10 | 10 | 10 |
| Sodium dehydroacetate | 0.2 | 0.2 | 0.2 | 0.2 | 0.2 | 0.2 | 0.2 | 0.2 | 0.2 | 0.2 | 0.2 | 0.2 | 0.2 | 0.2 |
| Water | 90 | 90 | 90 | 90 | 90 | 90 | 90 | 90 | 90 | 90 | 90 | 90 | 90 | 90 |
| Ultraviolet absorbing agent (I) | 0.5 | | 1.0 | | 0.5 | | 0.2 | | 4.0 | 0.5 | | | | |
| Ultraviolet absorbing agent (II) | | 0.5 | | 2.0 | | 3.5 | | 1.0 | | | 0.5 | 0.5 | | |
| Sodium carbonate | | | | | | | | 0.5 | 1.0 | | | | | |
| Potassium carbonate | 1.0 | | | | | | | | | | | | | |
| Sodium silicate | | | | 0.5 | | | | | | | | | | |
| Potassium silicate | | 0.4 | | | | | | | | | | | | |
| Sodium acetate | | | 0.5 | | 3.0 | 0.2 | | | | | | | | |
| Potassium acetate | | | | | | | 1.0 | | | | | | | |
| Lithium nitrate | | | | | | | | | | | | 1.0 | | |
| Disodium hydrogenphosphate | | | | | | | | | | | 1.0 | | | |
| Potassium chloride | | | | | | | | | | 1.0 | | | | |
| Experimental Results | | | | | | | | | | | | | | |
| Light resistance (100 hours) | 0 | 0 | 0 | 0 | 0 | 0 | 0 | 0 | 0 | 0 | 0 | 0 | X | X |
| Light resistance (150 hours) | 0 | 0 | 0 | 0 | 0 | 0 | 0 | 0 | 0 | Δ | Δ | Δ | X | X |
| Continuous jetting stability | 0 | 0 | 0 | 0 | 0 | 0 | 0 | 0 | 0 | 0 | 0 | 0 | 0 | 0 |

Note:
0:excellent
Δ:ordinary
X:poor

As will be apparent from the results shown in Tables 1 and 2, when the jet ink composition of the present invention is used, good continuous jetting stability can be obtained and the light-resistance of prints can be remarkably improved without degrading the electric and jetting characteristics of the ink jetting printing method.

What is claimed is:

1. A jet ink composition comprising an aqueous jet ink containing a water-soluble dye, a wetting agent and water as main components and, incorporated therein, a water-soluble ultraviolet absorbing agent, which is the compound of formula I

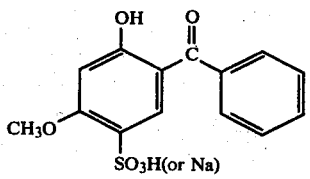

or the compound of formula II

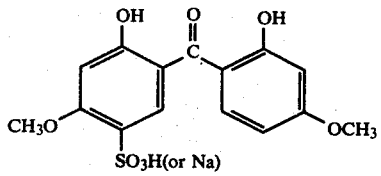

2. A jet ink composition comprising an aqueous jet ink containing a water-soluble dye, a wetting agent and water as main components and, incorporated therein, a water-soluble ultraviolet absorbing agent which is the compound of formula I

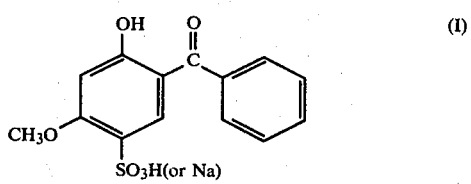

or the compound of formula II

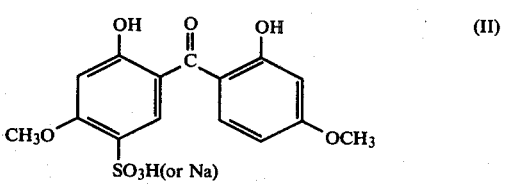

and at least one compound selected from the group consisting of carbonates, silicates, acetates, nitrates, phosphates, and chlorides of sodium, potassium and lithium.

3. A jet ink composition as set forth in claim 1 wherein the incorporated amount of the water-soluble ultraviolet absorbing agent is 0.2 to 10 parts by weight per 100 parts by weight of the composition.

4. A jet ink composition as set forth in claim 2 wherein the incorporated amounts of the water-soluble ultraviolet absorbing agent and the compound are 0.2 to 10 parts by weight and 0.1 to 5.0 parts by weight, respectively, per 100 parts by weight of the composition.